United States Patent
Matsco et al.

(12) 
(10) Patent No.: US 6,764,638 B1
(45) Date of Patent: Jul. 20, 2004

(54) PROCESS FOR MANUFACTURING A MOLDING PLASTIC WINDOW FOR AN AUTOMOTIVE VEHICLE AND WINDOW PRODUCED THEREBY

(75) Inventors: Mark M. Matsco, South Lyon, MI (US); Michael E. Sykes, Livonia, MI (US); David Kusuma, Canton, MI (US)

(73) Assignee: Exatec, L.L.C., Wixom, MI (US)

(*) Notice: Subject to any disclaimer, the term of this patent is extended or adjusted under 35 U.S.C. 154(b) by 745 days.

(21) Appl. No.: 09/595,824

(22) Filed: Jun. 16, 2000

Related U.S. Application Data

(60) Provisional application No. 60/140,422, filed on Jun. 22, 1999.

(51) Int. Cl.[7] .............................................. B29D 23/00
(52) U.S. Cl. ........................ 264/513; 264/516; 264/572; 156/245
(58) Field of Search ................................. 264/513, 516, 264/572; 156/245; 52/204.59, 204.62; 296/90, 93, 96.12

(56) References Cited

U.S. PATENT DOCUMENTS

| | | | |
|---|---|---|---|
| 4,477,507 A | * 10/1984 | Kunert | ........................ 428/188 |
| 5,035,096 A | 7/1991 | Ohtake et al. | |
| 5,331,784 A | * 7/1994 | Agrawal et al. | .............. 52/393 |
| 5,339,584 A | 8/1994 | Ohtake et al. | |

* cited by examiner

*Primary Examiner*—Suzanne E. McDowell
(74) *Attorney, Agent, or Firm*—Brinks Hofer Gilson & Lione

(57) ABSTRACT

A method of manufacturing a plastic window for an automotive vehicle in which a hollow frame portion is separately molded from a main optical panel the frame portion bonded to the perimeter of the main panel as by melt bonding.

6 Claims, 2 Drawing Sheets

PROCESS FOR MANUFACTURING A MOLDING PLASTIC WINDOW FOR AN AUTOMOTIVE VEHICLE AND WINDOW PRODUCED THEREBY

CROSS REFERENCE TO RELATED APPLICATIONS

This application claims the benefit of the filing date of provisional application No. 60/140,422, filed on Jun. 22, 1999.

BACKGROUND OF THE INVENTION

This invention concerns glazing particularly for automotive window panels. It has long been proposed to construct windows for automotive vehicles from synthetic resins, i.e., from plastic material. A suitable such material is polycarbonate, and use of this material of automotive windows has long been proposed. By hardcoating the surfaces by processes heretofore developed, sufficient scratch resistance can be achieved to produce automotive window panels performing well in service. Other coatings are also now available, such as UV blocking coatings to further improve the performance of plastic windows for automotive vehicles.

Molded plastic automotive windows offer a number of advantages over conventional glass glazing, including a significant reduction in vehicle weight and improved vehicle safety, as the polycarbonate panels better resist shattering as compared to glass, and in a crash fixed plastic windows keep the occupants from being ejected from the vehicle passenger compartment better than existing glass windows. Greater design freedom is afforded by plastic windows due to the ease in forming complex curved shapes.

One problem with polycarbonate panels used for automotive windows is a lack of edge stiffness, important for moving or "drop" windows. The edges of such plastic panels are insufficiently stiff to reliably maintain registry with the window guides and seals, and can be pushed out by impact of an occupant with the windows in a crash.

A requirement for existing fixed windows is a masking border to conceal the body and seal structure at the jointer of the window periphery to the body, which masking border requirement adds processing steps in manufacturing such window panels.

U.S. Pat. Nos. 5,339,584 and 5,035,096 both propose certain techniques in manufacturing synthetic resin windows for automotive vehicles in order to overcome the lack of stiffness in a molded plastic window panel.

U.S. Pat. No. 5,339,584 describes an insert molding technique for attaching a reinforced frame to an optical main glazing panel.

U.S. Pat. No. 5,035,096 describes producing a hollow frame portion extending about the perimeter of the main panel, the frame hollow portion formed by a gas assist technique, in which gas is injected into a cavity defining the frame portion, the gas expanding within the plastic to create the hollow shape of the frame portion.

In this approach, the hollow frame is molded as one piece with the optical panel and is thus formed from the same resin material, to be integrally molded therewith. In order to provide the masking border treatment, an extra painting or coating process is required. The hollow frame is an efficient way of achieving adequate perimeter stiffness, but there are several problems with the approach described in that patent.

Firstly, optical flaws are sometimes produced by the assist gas migrating into the main mold cavity where the main panel is formed Also, stress riser cavities could be formed by such migrating gas. Other slight optical flaws can occur because of the two cavities inducing residual stresses in the optical portion.

The resin used in the optical panel does not itself form a particularly stiff material, and the use of same material in the frame portion thus compromises the rigidity which could otherwise be achieved.

It is the object of the present invention to provide a manufacturing process for providing a hollow frame on the perimeter of a molded plastic main glazing panel which minimizes optical flaws in the main glazing panel.

It is a further object to provide such process in which the panel rigidity can be maximized by allowing the use of a different stiffer material in the frame portion.

Yet another object is to provide a process for manufacturing a glazing panel having a hollow perimeter frame which can eliminate other processing steps.

Still another object is to provide such process which allows many processing options to enhance manufacturing efficiency.

Summary of the Invention

These and other objects which can be appreciated by a reading of the following specification and claims are achieved by utilizing a two shot process, in which the optical main glazing panel is separately molded from the hollow frame portion, the hollow frame portion formed by a conventional gas assist process.

The two shot molding process can be achieved by various options including overmolding (using movable cores, with either the frame or main molded panel first, using a second nozzle, for example), transfer molding, in which a separate mold is used for each part, or insert molding in which one or the other part is molded first, and inserted in a mold for the second part.

Separate molding of the main panel and the hollow frame portion eliminates many of the optical flaws resulting from gas migration, residual stresses and sink marks.

Separate molding also allows different draft angles for the hollow frame portion.

The frame portion may be molded from a stiffer material such as a filled resin to maximize the rigidity of the frame portion to maximize the rigidity of the window edge.

The frame portion material can also be rendered opaque to provide border masking without the need for a separate coating or painting step, or to necessitate the a difficult insert film molding step described in the above referenced patents.

Simplification of the complete window manufacturing process is also possible with the two shot molding approach, i.e., reinforcing ribs, latching and hinging features can be more easily molded into the frame portion to eliminate attachment of separate parts.

DESCRIPTION OF THE DRAWING FIGS.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
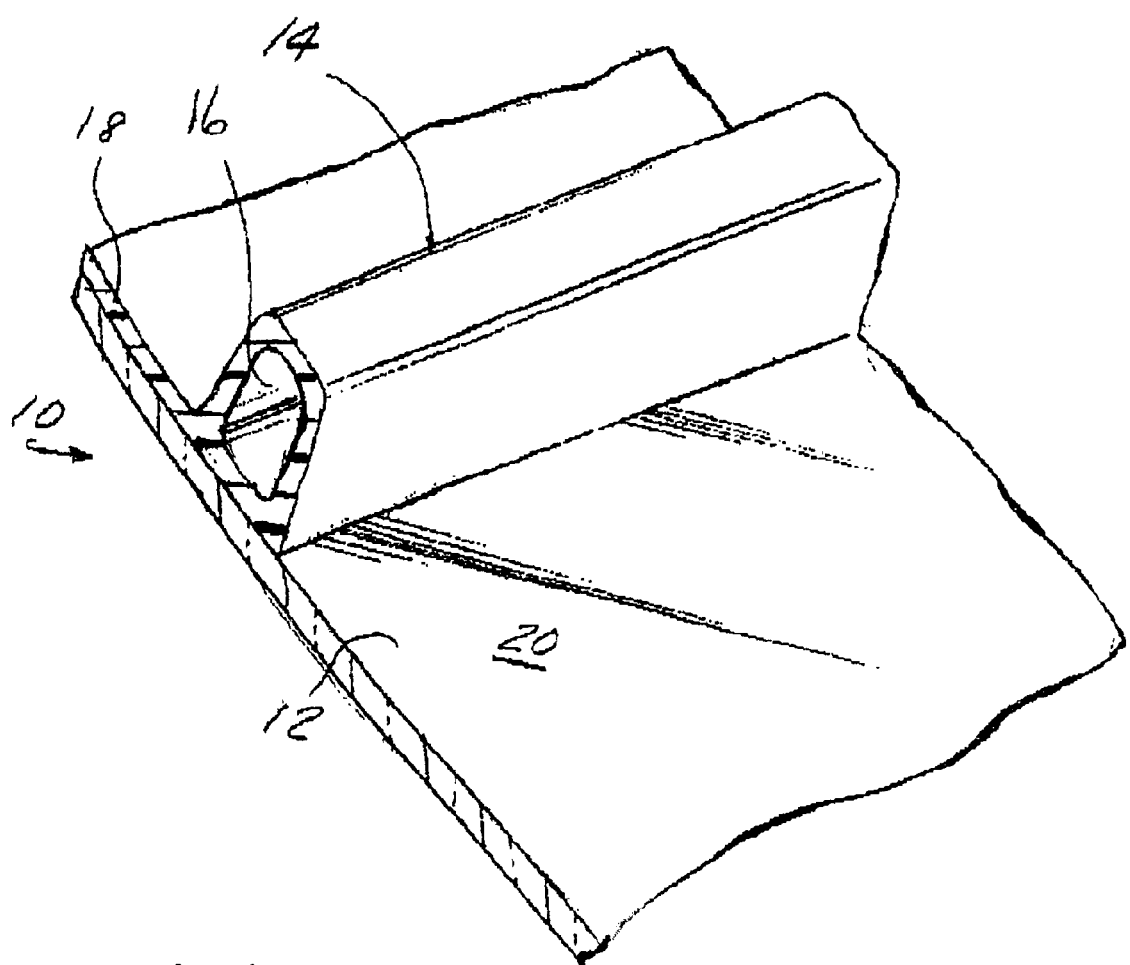
FIG. 1 is a fragmentary perspective view of a molded plastic window panel made by a process according to the present invention.
Figure 2:
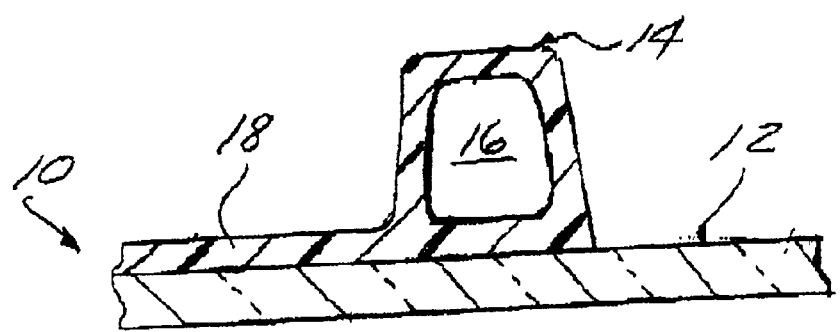
FIG. 2 is a transverse sectional view of the window panel shown in FIG. 1.

Referring to the drawings, and particularly FIGS. 1 and 2, a portion of a molded plastic automotive window 10 is shown, which includes a main glazing panel 12 optically undistorted, and a hollow frame portion 14 extending about the perimeter of the main panel 12. The main glazing panel 12 is injection molded from a suitable synthetic resin such as polycarbonate as a first shot, producing a generally planar panel, although typically having some degree of curvature as desired for a particular application.

The hollow frame portion 14 is injection molded in a second shot, using gas assist techniques to produce a cavity 16 creating the hollow cross section of the frame portion 14. The hollow frame portion 14 has a wall 18 having one side contiguous to and overlying the inside surface 20 of the main panel 12. The material used to mold the frame portion 14 is preferably of a stiffer modulus such as a filled polycarbonate or another resin which is compatible so as to form a melt bond between the contiguous surfaces. The resin material can be blackened as by the addition of lamp black, or rendered opaque in some other way such that the frame portion 14 itself provides the masking border treatment for the perimeter of the window 10.

The two shot molding steps can be carried out in various alternative ways, i.e., using a common mold with movable inserts or separate molds using the first molded part as an insert. Gas assist injection mold components must also be incorporated in the mold. Since these techniques and mold design features are well known in the field, such mold details are not here described in detail.

Main panels 12 produced by the method of the present invention are usually free of the optical flaws described above, while providing a substantially enhanced edge stiffness of the complete window 10.

Figure 3:
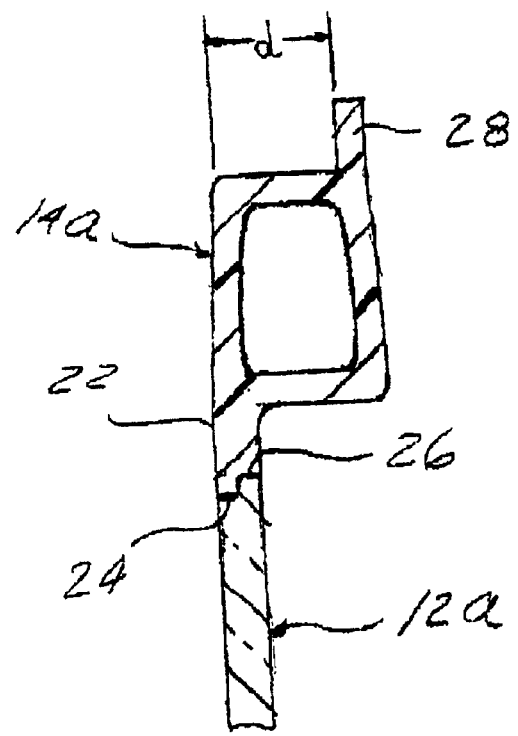
FIG. 3 is a sectional view of a second embodiment of a window panel according to the invention.

FIG. 3 shows another form of connection between a main panel 12A and a hollow frame portion 14A, in which an inwardly projecting rib 22 has an angled edge 24 which abuts a perimeter edge 26 of the main panel 12A, bonded along the interface so formed. The hollow frame portion 14A also has an integral outwardly projecting rib 28 offset out the plane of the main panel 12A. The rib 28 forms an outer rim which defines a plane parallel but offset to the generally defined by the main panel 12A, and can thus be used to retain the window 10A in a body structure mounted window guides (not shown), securing the window in position against a weather seal (not shown) and preventing the window 10A from being too easily pushed out of the window opening.

The offset "d" is advantageous in that the outer surface of the main panel 12A can now lie in approximately the same plane as the body sheet metal for improved styling.

Figure 4:
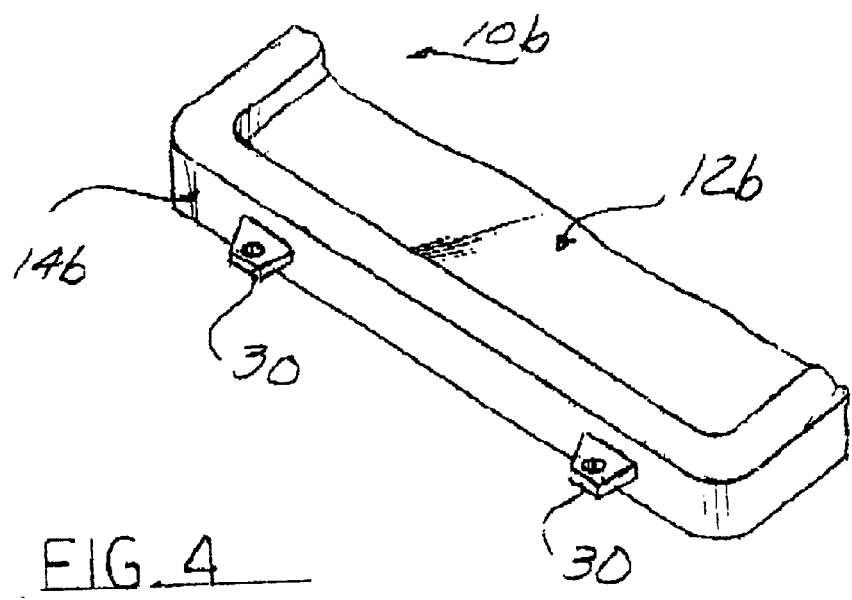
FIG. 4 is a fragmentary perspective view of a third embodiment of a window panel according to the present invention

FIG. 4 illustrates a window 10B in which the frame portion 14B has integral attachment features 30 molded with the frame portion 14B.

Other features such as hinges, bosses, locators can easily be integrally molded at the same time since the frame portion 14B is molded separately from the main panel 12B.

What is claimed is:

1. A method of manufacturing a window for an automotive vehicle comprising the steps of:

molding a main panel from a transparent synthetic resin, substantially free from optical distortion;

separately molding a supporting frame portion from a synthetic resin, including the step of inducing gas assist expansion of the frame portion to form a hollow cavity extending along said frame portion, said frame portion configured to be fit to an outer perimeter of said main panel, said frame portion molded from a synthetic resin and configured to provide a substantially enhanced edge stiffness of the perimeter of said panel; and joining said frame portion to said main panel outer perimeter.

2. The method according to claim 1 wherein in said joining step, said frame portion is melt bonded to said main panel by inserting one of either said main panel or said frame portion in a mold in which the other of said main panel or said frame portion is molded.

3. The method according to claim 1 further including the step of molding an outwardly projecting rib into said frame portion defining a rim in a plane parallel to but offset from a plane generally defined by said main panel.

4. The method according to claim 1 further including the step of molding said frame portion from an opaque synthetic resin material to cause said frame portion to define a masking border extending about the perimeter of said main panel.

5. The method according to claim 1 wherein said frame portion is molded from a synthetic resin of a stiffniess greater than the synthetic resin from which said main panel is molded.

6. The method according to claim 1 wherein said main panel is molded from polycarbonate resin.

* * * * *